W. C. BAKER.
BRAKE MECHANISM.
APPLICATION FILED OCT. 13, 1913.
1,132,540.
Patented Mar. 16, 1915.
2 SHEETS—SHEET 1.
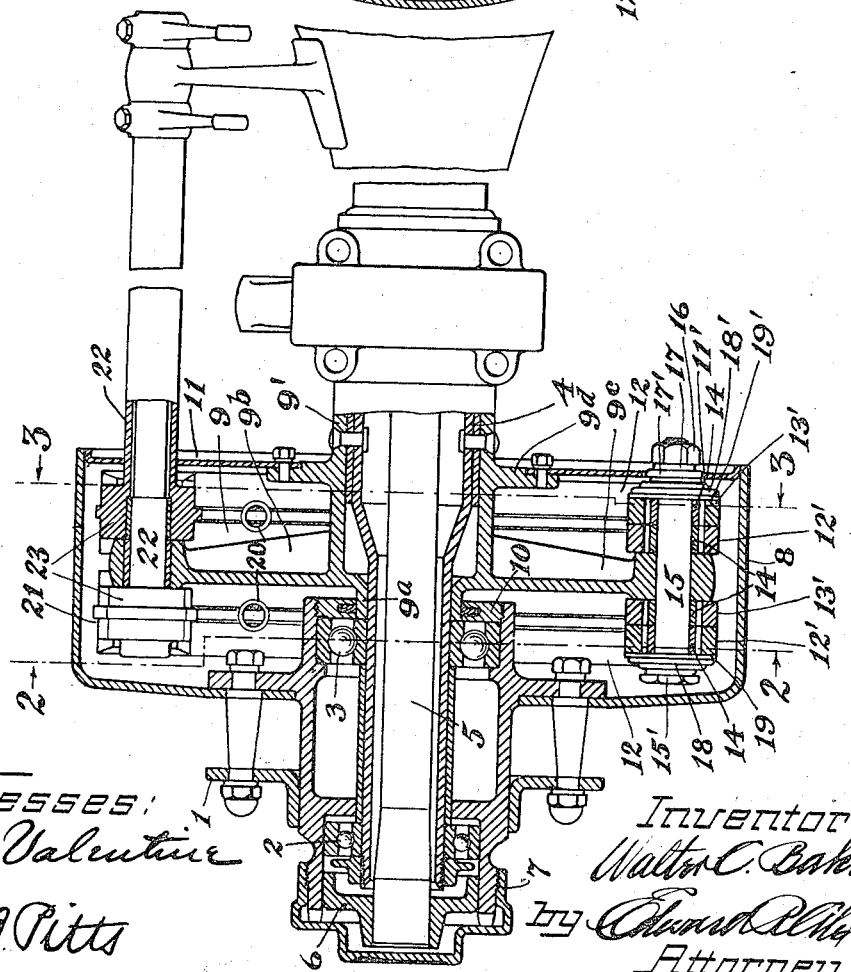
Witnesses:
F. C. Valentine
Geo. B. Pitts
Inventor:
Walter C. Baker
by Edward A. Alexander
Attorney.

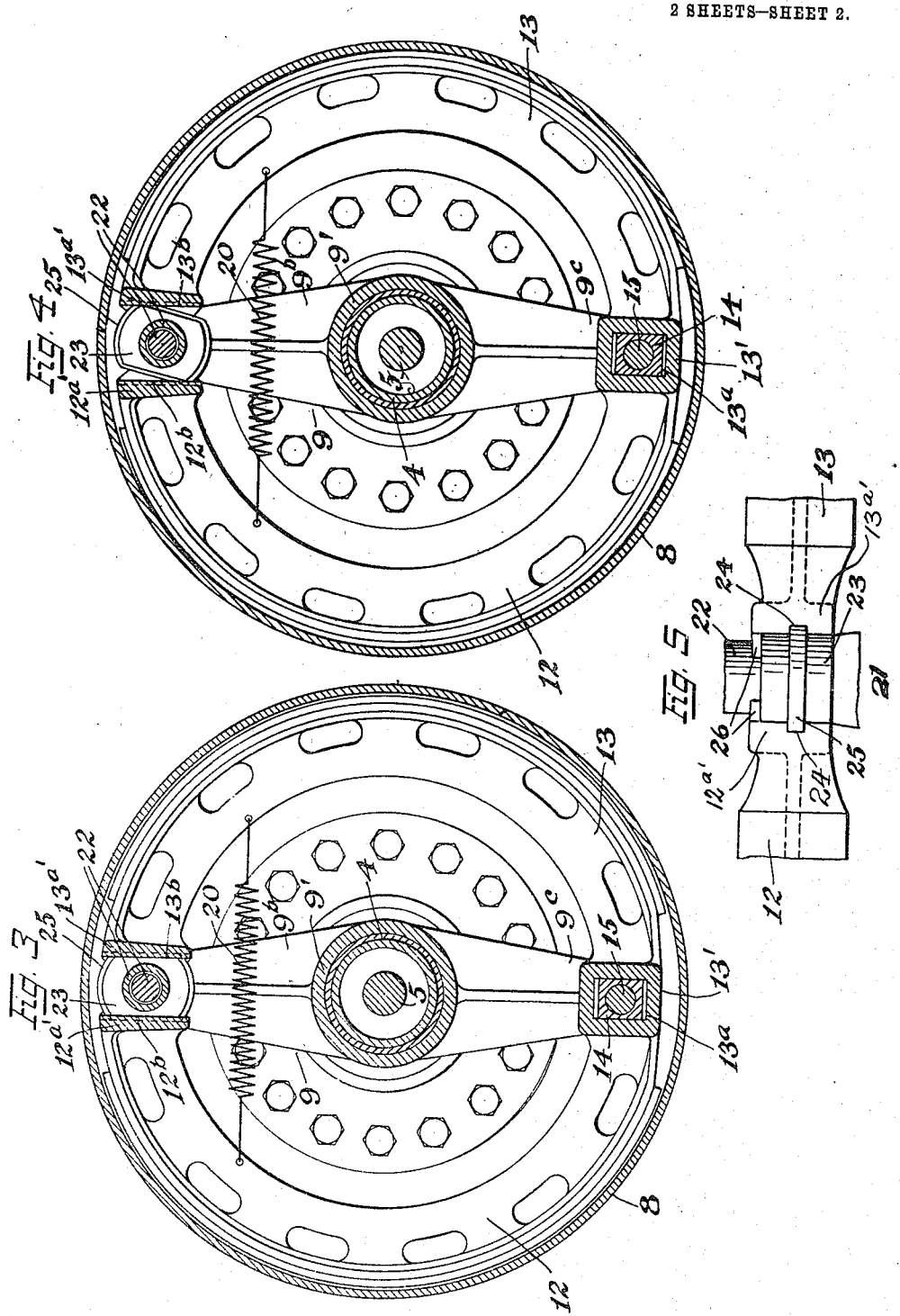

UNITED STATES PATENT OFFICE.

WALTER C. BAKER, OF CLEVELAND, OHIO, ASSIGNOR TO THE AMERICAN BALL BEARING COMPANY, OF CLEVELAND, OHIO, A CORPORATION OF OHIO.

BRAKE MECHANISM.

1,132,540.     Specification of Letters Patent.     Patented Mar. 16, 1915.

Application filed October 13, 1913. Serial No. 794,786.

*To all whom it may concern:*

Be it known that I, WALTER C. BAKER, a citizen of the United States, residing at Cleveland, in the county of Cuyahoga and State of Ohio, have invented certain new and useful Improvements in and Relating to Brake Mechanism, of which the following is a specification.

This invention relates to brake mechanism, and particularly to that type of brake mechanism having a drum and a plurality of arc shaped brake members movable into and out of engagement with said drum.

One object of the invention is to provide a brake mechanism which produces efficient braking effects upon the application of a relatively small amount of power.

Another object of the invention is to provide, in a brake mechanism of this character supporting means which permit the brake members to accommodate themselves readily and quickly to the drum surface when operated.

Another object of the invention is to provide means for limiting the free movement of the brake members when they are in normal or inactive position.

Further objects of the invention consist of correlating the parts and causing them to co-act as hereinafter described and claimed.

For the purpose of illustration, I have, in the accompanying drawings, shown and described one form of brake mechanism embodying my invention.

Figure 1 is a fragmentary top plan view, partly in section, of vehicle axle and wheel having a brake mechanism embodying my invention. Fig. 2 is a section on the line 2—2 of Fig. 1, looking in the direction of the arrow. Fig. 3 is a section on the line 3—3 of Fig. 1 with the brake shoes retracted. Fig. 4 is a section on the same line as Fig. 3 with the brake shoes expanded. Fig. 5 is a detail view.

In the drawings, 1 indicates a vehicle wheel hub mounted on anti-friction bearings 2, 3 supported upon the outer end of an axle tube or casing 4.

5 is a driven axle section extending through the axle tube 4 and connected with the hub 1 by a clutch plate 6, this connection being maintained by means of a hub cap 7.

8 is a brake drum carried by the hub 1 and rotatable therewith.

9 is a support for the brake shoes and their operating mechanism. It comprises a cylindrical section 9' secured to the axle tube 4, a cylindrical section 9ª, incasing the tube 4 adjacent the inner end of the wheel hub, and diametrically opposed arms 9ᵇ, 9ᶜ, arranged between its said sections 9' and 9ª.

10 is a packing gland between the inner flange of the wheel hub and the support 9.

11 is an annular closure extending between the flange 9ᵈ and the inner surface of the brake drum 8, so as to practically close the inner end of the brake drum and prevent access of dirt or dust to the brake mechanism in so far as practical manufacturing and operating limits permit.

I have illustrated two sets or couples of brake shoes, one at either side of the diametrically extending arms 9ᵇ, 9ᶜ. As these sets are alike in construction, it will be necessary to describe but one of them. Each set of brake shoes comprises two arc shaped sections 12, 13. Their adjacent ends 12', 13', respectively, are provided with alined rectangular passage ways 12ª, 13ª, each arranged to receive a rectangular slide 14 which is pivotally mounted on a bolt 15 which extends through the arm 9ᶜ. The bolt 15 at one end has a head 15'. Its other end extends through an opening 11' in the closure 11 and carries a nut 16 and washers 17, 17'.

18 is a coiled spiral spring interposed between the bolt head 15' and the washer 19. 18' is a similar spring interposed between the washers 17' and 19'. These springs provide for necessary lateral movement in operation of the brake shoes, while tending to keep the shoes of both sets in normal position and to prevent rattling of the connected parts. The connection between each of the brake shoes and the pivot 15 is such as to permit the oscillation of each shoe about the axis of the pivot 15 and the bodily movement of each shoe to and fro relative to said axis.

The ends 12ª', 13ª', of the brake shoes substantially diametrically opposite the pivot 15 are free to move toward and from each other. They are normally drawn together by means of a spring 20 secured at either end to the adjacent brake shoe. They are expanded into engagement with the inner surface of the drum through the instrumentality of an expander or cam mechanism indicated as an entirety by 21. It consists of the pivotally mounted shaft 22 carrying a cam 23, the surfaces of which are adapted to engage with the adjacent end surfaces 12$^b$, 13$^b$ of the brake shoes 12, 13, respectively. Each of these shoe end surfaces is grooved as indicated at 24 to receive a rib 25 on the cam. This tongue and groove construction serves to limit relative lateral movement of the shoes at their free ends within the drum.

At its free end each brake shoe carries a flange 26, which if desired may be formed integrally therewith. Each flange 26 is recessed in the arc of a circle as indicated at 26' to fit over the operating shaft 22 for the adjacent cam 23 and to limit the up and down movement of the brake shoe relative to the axis of said cam when the brake shoes are retracted or in inactive position. A certain amount of this up and down movement is permitted in order to insure freedom of action of all the parts of the brake shoe and the cam mechanism. The shape of the recess at 26' is such that the greater the distance which the cam forces apart the ends of the brake shoes with which it engages, the more up and down movement relative to the cam shaft will be permitted by the flange 26. On the other hand, when the brake shoe is retracted or drawn away from the drum at its free end, the surface 26' approaches quite closely to the periphery of the cam shaft and may engage therewith to move the shoe, as the case may be, up or down relative to the axis of the shaft 15 so as to insure that the shoe will be free of the inner periphery of the brake 8 both at its top and bottom. The operating rod 22 for the expander for the outermost pair of brake shoes extends through the support or arm 9$^b$ in which it is pivotally mounted and loosely through the tubular shaft 22 for operating the expander for the innermost pair of brake shoes. Any suitable mechanism (not shown) may be employed for actuating the rods or shafts 22 to rotate or oscillate the cams 23 carried thereby, respectively.

It will be noted that my construction is such that the brake shoes of each set are permitted sufficient movement in various directions relative to the drum to insure that when they are operated through the instrumentality of their expanding cam, they will freely and quickly accommodate themselves so as to engage considerable areas of the interior of the brake drum and that an effective braking action may be had with a relatively small angular movement of the cam. Also, that when the brake shoes are released from the drum they are automatically drawn together at their free ends and at the same time if needs be are caused to slide on their respective guides 14 in such manner as to free themselves entirely at their pivoted ends from the brake drum, through the instrumentality of the centering elements 26. In fact, the centering element 26 at the free end of each brake shoe insures that the shoe when drawn into inactive position will be free from the drum at all points.

To those skilled in the art of making apparatus of the class described, many alterations in construction and widely differing embodiments and applications of my invention will suggest themselves, without departing from the spirit and scope thereof.

My disclosures and the description herein are purely illustrative, and are not intended to be in any sense limiting.

What I claim is:—

1. In combination, a brake drum, a brake shoe, a pivot, a slide and guide connection between one end of said brake shoe and said pivot, said slide and its guide being mounted on said pivot to swing about the axis thereof, and an expanding cam disposed to engage the free end of said brake shoe.

2. In combination, a brake drum, a brake shoe, a pivot, a slide and guide connection between one end of said brake shoe and said pivot, said slide and its guide being mounted on said pivot to swing about the axis thereof, means for swinging said brake shoe around the axis of said pivot into and out of engagement with said drum, and means for sliding said brake shoe relative to said pivot and out of engagement with said drum.

3. In combination, a brake drum, a brake shoe, a support for the latter, a combined slide and guide and pivot connection between one end of said brake shoe and said support, an expander for the other end of said brake shoe, and means to engage said brake shoe as it is retracted and slide it relative to the axis of the pivot.

4. In combination, a brake drum, a support, a pair of opposed brake shoes arranged within said drum, means connecting adjacent ends of said brake shoes to said support including a pivot, a slide and a guide, and means interposed between the free ends of said brake shoes for expanding them about the axis of said pivot.

5. In combination, a brake drum, a support, a pair of opposed brake shoes arranged within said drum, means connecting adjacent ends of said brake shoes to said support including a pivot, a slide and a guide, means interposed between the free ends of said brake shoes for expanding them about the axis of said pivot, means for retracting the shoes, and means to engage said shoes as they are retracted and slide them relative to the axis of said pivot.

6. In combination, a brake drum, a pair of opposed brake shoes, a support for said brake shoes, means connecting one end of each brake shoe to said support, permitting both oscillation and sliding of said shoe relative to said support, means for expanding and retracting said brake shoes, and means operative as said brake shoes move away from said drum to slide said shoes relative to said support.

7. In combination, a brake drum, a brake shoe having a rectangular guideway formed in one end thereof, a support for said shoe, a rectangular slide in said guideway, a pivot between said slide and said support, and means for actuating said shoe.

In testimony whereof I affix my signature, in the presence of two witnesses.

WALTER C. BAKER.

Witnesses:
 GEO. B. PITTS,
 EDWARD R. ALEXANDER.